United States Patent
Poshusta et al.

(10) Patent No.: US 8,722,005 B1
(45) Date of Patent: May 13, 2014

(54) SYNTHESIS OF HYDROGEN BIS(FLUOROSULFONYL)IMIDE

(71) Applicants: Joseph Carl Poshusta, Broomfield, CO (US); Jerry Lynn Martin, Superior, CO (US); Rajendra P. Singh, Broomfield, CO (US)

(72) Inventors: Joseph Carl Poshusta, Broomfield, CO (US); Jerry Lynn Martin, Superior, CO (US); Rajendra P. Singh, Broomfield, CO (US)

(73) Assignee: Boulder Ionics Corporation, Arvada, CO (US)

( * ) Notice: Subject to any disclaimer, the term of this patent is extended or adjusted under 35 U.S.C. 154(b) by 0 days.

(21) Appl. No.: 13/951,973

(22) Filed: Jul. 26, 2013

(51) Int. Cl.
*C01B 21/086* (2006.01)
*C07C 303/00* (2006.01)

(52) U.S. Cl.
USPC ............................. 423/386; 564/82; 568/35

(58) Field of Classification Search
USPC ............... 423/386, 388, 467; 564/82; 568/35
See application file for complete search history.

(56) References Cited

U.S. PATENT DOCUMENTS

| | | | |
|---|---|---|---|
| 7,253,317 | B2 | 8/2007 | Cernik et al. |
| 7,919,629 | B2 | 4/2011 | Michot |
| 8,134,027 | B2 | 3/2012 | Okumura et al. |
| 8,377,406 | B1 | 2/2013 | Singh et al. |
| 2011/0178306 | A1* | 7/2011 | Michot .................. 548/101 |
| 2012/0041233 | A1 | 2/2012 | Sato et al. |

* cited by examiner

*Primary Examiner* — Anthony J Zimmer
*Assistant Examiner* — Justin Bova
(74) *Attorney, Agent, or Firm* — Don D. Cha; Hamilton DeSanctis & Cha, LLP

(57) ABSTRACT

The invention provides a method for producing hydrogen bis(fluorosulfonyl)imide (HFSI) by reacting hydrogen bis(halosulfonyl)imide (HXSI) with hydrogen fluoride, where each X is independently a nonfluoro-halide, such as Cl, Br, or I.

20 Claims, 2 Drawing Sheets

SYNTHESIS OF HYDROGEN BIS(FLUOROSULFONYL)IMIDE

FIELD OF THE INVENTION

The present invention relates to a method for producing hydrogen bis(fluorosulfonyl)imide (HFSI) from hydrogen bis(halosulfonyl)imide (HXSI) using hydrogen fluoride, where X is a nonfluoro-halide.

BACKGROUND OF THE INVENTION

The bis(fluorosulfonyl)imide anion ($FSI^-$) is useful in various applications including electrolytes in electrochemical devices such as batteries and capacitors. The present invention is directed at the synthesis of hydrogen bis(fluorosulfonyl)imide (HFSI), which is a useful intermediate for salts and ionic liquids containing this anion.

Hydrogen bis(fluorosulfonyl)imide, its corresponding salts and ionic liquids comprising the FSI anion have been shown to be useful in a wide variety of applications including, but not limited to, as electrolytes in lithium ion batteries and ultracapacitors. Hydrogen bis(fluorosulfonyl)imide is a relatively strong acid and forms various stable metal salts. The lithium salt of bis(fluorosulfonyl)imide (i.e., LiFSI) has shown to be particularly useful in batteries and ultracapacitors.

Despite the advantages of compounds containing the FSI anion, the corresponding salts and ionic liquids thereof, no large scale commercial production exists. While many processes for producing HFSI are known, each of the known methods for synthesizing HFSI has disadvantages. For example, one method for synthesizing HFSI uses urea ($NH_2CONH_2$) and fluorosulfonic acid ($FSO_3H$). One of the major disadvantages for this process is the toxicity and corrosiveness of fluorosulfonic acid. Moreover, it is difficult to control this reaction due to local overheating during the addition of fluorosulfonic acid to the reaction mixture. This difficulty in controlling the reaction results in an unpredictable yield of the desired product.

Another method for synthesizing HFSI involves fluorinating bis(chlorosulfonyl)-imide (i.e., HCSI) with arsenic trifluoride ($AsF_3$). In this reaction, HCSI is treated with $AsF_3$. Arsenic trifluoride is toxic and because it has a high vapor pressure, it is particularly difficult to handle on an industrial scale. A typical reaction uses 1:8.6 ratio of HCSI to $AsF_3$. This means a large excess of highly dangerous arsenic trifluoride is used.

HFSI can also be prepared by the fluorination of HCSI with antimony trifluoride ($SbF_3$). The antimony trichloride byproduct of this reaction has both high solubility in HFSI and a very similar boiling point, making it very difficult to separate from the desired product. The product of this reaction is also typically contaminated with chloride, which renders the product unsuitable for electrochemical applications.

One of the simplest reactions for producing HFSI is to react hydrogen bis(halosulfonyl)imide (HXSI) with hydrogen fluoride, where X is a nonfluoro-halide. However, this reaction has been reported to produce a relatively poor yield and involved reacting HCSI with excess anhydrous HF at high temperature. See, for example, U.S. Pat. No. 7,919,629. In particular, Example 10 of U.S. Pat. No. 7,919,629 discloses reacting HCSI with anhydrous HF at various temperatures. The best yield was 55% at 130° C. for 2 hours. Some reaction was observed after 12 hours at 30 and 50° C. (<10% yield). The inventor of this patent observed fluorosulfonic acid as a degradation product. More significantly, the inventor concludes that " . . . the synthesis of HFSI with HF is not satisfactory." (Emphasis added).

Accordingly, there is a need for a relatively safe and/or simple method for producing a high yield of hydrogen bis(fluorosulfonyl)imide.

SUMMARY OF THE INVENTION

As stated above, U.S. Pat. No. 7,919,629, discloses that the reaction between HCSI and HF is not a satisfactory method to produce HFSI.

Surprisingly and unexpectedly, in contrast to U.S. Pat. No. 7,919,629, the present inventors have found that under appropriate conditions, a high yield, e.g., at least 80% yield, of HFSI can be obtained using HF and hydrogen bis(halosulfonyl)imide (HXSI, where each X is independently a non-fluorohalide such as Cl, Br, or I). One particular aspect of the invention provides a method for producing a high yield of hydrogen bis(fluorosulfonyl)imide (HFSI) from hydrogen bis(halosulfonyl)imide (HXSI) using hydrogen fluoride. It was discovered by the present inventors that HFSI yield of at least 80%, typically at least 95%, often at least 98% and more often at least 99% can be achieved using HF. In the formula above, X in HXSI is a nonfluorohalide, e.g., each X is independently Cl, Br, or I, often X is Cl.

DETAILED DESCRIPTION OF THE INVENTION

Figure 1:
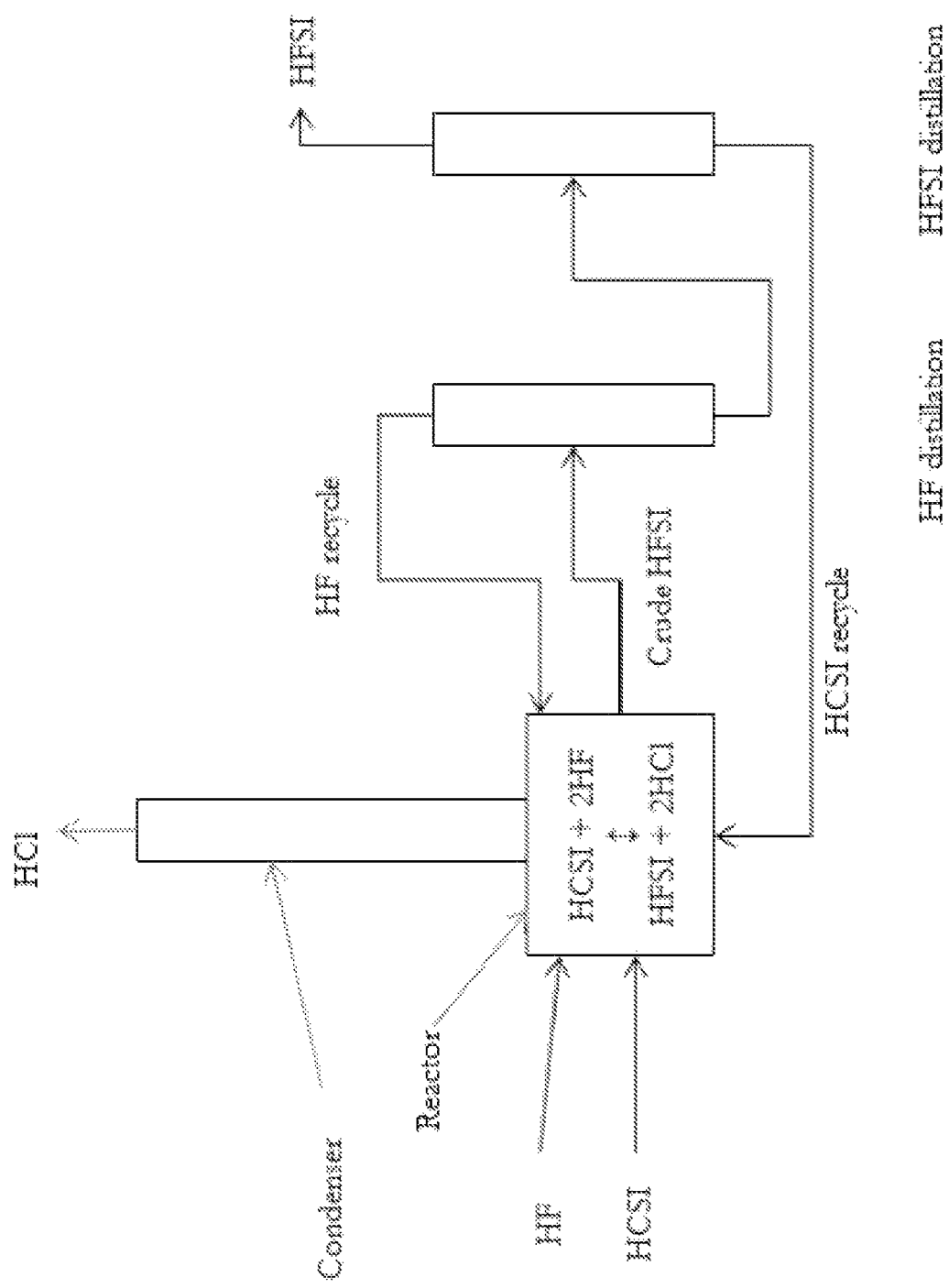
FIG. 1 is a schematic illustration of one particular embodiment of a continuous stirred-tank reactor ("CSTR") for HFSI synthesis with distillation and recycle.

Synthesis of HFSI has been demonstrated by multiple routes including in a commonly assigned U.S. Pat. No. 8,377,406, which discloses inter alia fluorination of hydrogen bis(chlorosulfonyl)imide (HCSI) using bismuth trifluoride.

As discussed above, attempts by others to produce HFSI from HCSI using anhydrous HF resulted in a relatively low yields and impure products. See, for example, U.S. Pat. No. 7,919,629, issued to Michot. In fact, U.S. Pat. No. 7,919,629 unequivocally states that "the synthesis of HFSI with HF is not satisfactory." Col. 36, line 67. The best yield obtained in U.S. Pat. No. 7,919,629 was 55% at 130° C. for 2 hours. See Table on Col. 36, lines 50-60.

Surprisingly and unexpectedly, under proper conditions the present inventors were able to achieve a substantially higher yield of HFSI by reacting a hydrogen bis(halosulfonyl)imide (HXSI, where each X is independently a nonfluorohalide such as Cl, Br, or I) with hydrogen fluoride. As used herein, when describing a chemical reaction, the terms "treating", "contacting" and "reacting" are used interchangeably herein, and refer to adding or mixing two or more reagents under appropriate conditions to produce the indicated and/or the desired product. It should be appreciated that the reaction which produces the indicated and/or the desired product may not necessarily result directly from the combination of two reagents which were initially added, i.e., there may be one or more intermediates which are produced in the mixture which ultimately leads to the formation of the indicated and/or the desired product. In fact, using methods disclosed herein, the desired HFSI can be produced from HXSI and HF in at least 80% yield, typically at least 95% yield, often at least 98% yield, and more often at least 99% yield.

In some embodiments, the reaction also produces HX. In some instances, the step of reacting HXSI with HF also comprises removing HX that is produced in the reaction. Typically, the boiling point of HX is lower than that of HF added. Therefore, HX can be removed by simple distillation or evaporation. Any HF that may evaporate or distill during the process of removing HX can be condensed and returned back into the reaction mixture. Generally, by adjusting the condensation temperature, one can selectively condense HF while allowing HX to be distilled away from the reaction mixture. Because HX generated is corrosive, one can capture distilled HX by allowing the distilled HX to pass through another condenser at a temperature that is sufficiently low enough to allow HX to be captured. Alternatively, HX can be neutralized by contacting with a base. In another method, HX can be captured in water to yield an aqueous acid.

In some embodiments, the reaction condition for reacting HXSI with HF comprises HF refluxing condition. At atmospheric pressure, the boiling point of HF is 19.5° C. Thus, a cool condenser can be used to condense HF back into the reaction mixture. In comparison, the boiling point of HCl, HBr, and HI are all lower than that of HF. Accordingly, these gases can be selectively removed from the reaction mixture by selectively condensing HF back into the reaction mixture. For example, by adjusting the condensation temperature, using ice-water or dry ice and a solvent, one can condense HF to liquid while maintaining HX to remain as a gas, which can be easily removed, e.g., by allowing it to escape the reaction mixture and trapping the gaseous HX or by reacting the HX generated with a base.

Due to a relatively low boiling point of HF, most, if not all, previous attempts to produce HFSI with HF utilized a pressurized reaction vessel. Such a pressurized reaction vessel kept all reactants and products within the reaction vessel until the reaction was stopped. By conducting the reaction at an ambient (e.g., atmospheric) pressure condition, the present inventors have discovered that surprisingly a high yield of HFSI was produced using HF. Without being bound by any theory, by removing HX as it is generated during the reaction further increases the yield of HFSI in accordance with the Le Chatelier's Principle.

In some embodiments, X is Cl. Methods for producing bis(chlorosulfonyl)imide (HCSI) are well known to one skilled in the art. See, for example, commonly assigned U.S. Pat. No. 8,377,406. See, also, U.S. Pat. No. 7,919,629.

Methods of the invention can be conducted by adding HF batch-wise. Typically, HF is added in a gaseous form and is allowed to condense back into the reaction mixture via a condenser. Alternatively, the reaction can be conducted by adding HF continually or continuously until a desired amount of HF has been added. Still alternatively, HF can be added substantially all at once, e.g., as fast as the desired amount of HF condensation can be achieved. Typically, however, HF is continuously added or added in a controlled manner throughout the reaction time at a substantially constant temperature.

The amount of HF added to the reaction is at least 1 equivalent compared to the amount of HXSI added. It should be appreciated that theoretically one mole of HXSI requires 2 moles of HF to produce the desired HFSI. Accordingly, 1 equivalent of HF is equal to twice the number of moles of HXSI used. For example, if 1 mole of HXSI is used, then 1 equivalent of HF is 2 moles of HF. Because there can be some loss of HF in the reaction, typically the total amount of HF added is more than 1 equivalent, often at least 1.5 equivalent, more often at least 2 equivalents, and still more often at least 2.5 equivalents.

The reaction temperature for methods of the invention is at least that of the boiling point of HX that is produced. In this manner, HX that is produced can be easily removed from the reaction mixture by distillation or evaporation. Since the boiling point of HF is higher than HX, any HF that is also evaporated or distilled can be condensed back into the reaction mixture by using a condenser of appropriate temperature. Typically, the reaction temperature is at least 30° C., often at least 60° C., and more often at least 100° C.

As stated above, in contrast to the assertion in U.S. Pat. No. 7,919,629 that HFSI cannot be produced in a satisfactory yield using HCSI and HF, it has been found by the present inventors that under certain reaction conditions, reacting HF with HXSI resulted in formation of HFSI in at least 80% yield, typically in at least 85% yield, often at least 90% yield and more often at least 95% yield.

While not necessary, in some embodiments, methods of the invention include adding a catalyst. In particular, in some instances, HXSI is reacted with HF in the presence of a catalyst. Exemplary catalysts that can be used in methods of the invention include a Lewis acid. Suitable Lewis acids that can be used in method of the invention include salts of an alkaline metal, arsenic, antimony, bismuth, and zinc. In some particular embodiments, suitable catalysts for methods of the invention include, but are not limited to, Bi(III) compounds, such as $BiCl_3$, $BiF_3$, and Sb(III) compounds such as $SbCl_3$ and $SbF_3$, and As(III) compounds such as $AsCl_3$ and $AsF_3$. Within these embodiments, in some instances, the catalyst comprises a Bi(III) compound. In other instances, the catalyst is a bismuth trihalide compound, such as $BiCl_3$ and $BiF_3$.

When a catalyst is used, typically about 0.5 equivalent or less, often 0.2 equivalent or less, and more often 0.1 equivalent or less relative to the total initial amount of HXSI is added to the reaction.

One particular aspect of the invention provides a process for producing hydrogen bis(fluorosulfonyl)imide (HFSI) from hydrogen bis(chlorosulfonyl)imide (HCSI) in at least 80% yield. The process of this aspect of the invention comprises: reacting HCSI with HF under conditions sufficient to reflux HF and selectively removing hydrochloric acid (HCl) that is formed in the reaction.

In one particular embodiment, the reaction condition comprises atmospheric pressure.

Yet in another embodiment, HCSI is reacted with HF in the presence of a catalyst. Suitable catalysts are those disclosed herein and include bismuth trichloride and bismuth trifluoride.

In some embodiments, the reaction is conducted in a continuous stirred tank reactor with continuous HCSI and HF feeds. In some instances, the crude product stream is distilled to recover purified HFSI. Any unreacted HCSI and HF that may be present can be recycled back into the reactor.

It should be appreciated that in a reaction shown below involving exchange of a nonfluorohalide (such as chlorine) with a fluorine atom, an equilibrium between forward and reverse reactions can limit the conversion to the desired exchanged product.

$$HCSI + 2HF \leftrightarrow HFSI + 2HCl$$

According to the Le Chatelier's Principle, selective removal of the HCl product in this reaction, would shift equilibrium to the right hand side thereby producing more of the desired HFSI. Whereas the previous attempts to react HCSI with HF were in a sealed vessel due to the low boiling point of HF, the present invention utilizes an open reactor where HCl can be removed while preventing HF from escaping by condensing gaseous HF back into the reaction mixture. In particular, the invention includes boiling or distilling volatile species HF and HCl from the reaction mixture and selectively condensing and returning HF back into the reaction mixture while allowing gaseous HCl to leave the reaction mixture. Alternatively, one can use a membrane separation, extraction, adsorption, ion exchange and other separation methods where HCl can be selectively removed from the reaction mixture.

A catalyst can act to increase the equilibrium and/or the rate of reaction so that the reaction proceeds more quickly at a specific temperature. It should be appreciated, however, that the reaction does not require a catalyst to give acceptable results. In some instances, it was shown that the catalyst enhances reaction rate significantly at about 60° C. At 100° C., the catalytic effect was relatively smaller.

The invention may be conducted in either a batch-wise or continuous fashion. In a batch-wise approach, a reactor is loaded with HCSI, HF and optionally catalyst, and then the HF is refluxed until HCl is completely removed. In practice, the boiling point temperature of the reaction mixture strongly depends on the amount of unreacted HF in the reactor with higher HF concentrations giving lower reaction boiling points. Thus, in order to maintain a sufficiently high reaction temperature, HF may be added gradually during the reaction to prevent the amount of excess HF at any given time from being too high to achieve the desired reaction temperature. The normal boiling point of pure HF is near room temperature (19.5° C.), and those of both HCSI and HFSI are well above 100° C. HCl is a gas at room temperature with a normal boiling point of −85° C.

The reaction boiling point temperature can be used to monitor reaction progress. As HF is consumed, the reaction boiling point increases. Carefully metering the HF feed rate can maintain a constant temperature and can also indicate the reaction rate. The reaction is completed when the feed rate drops to zero at the reaction temperature.

Figure 2:
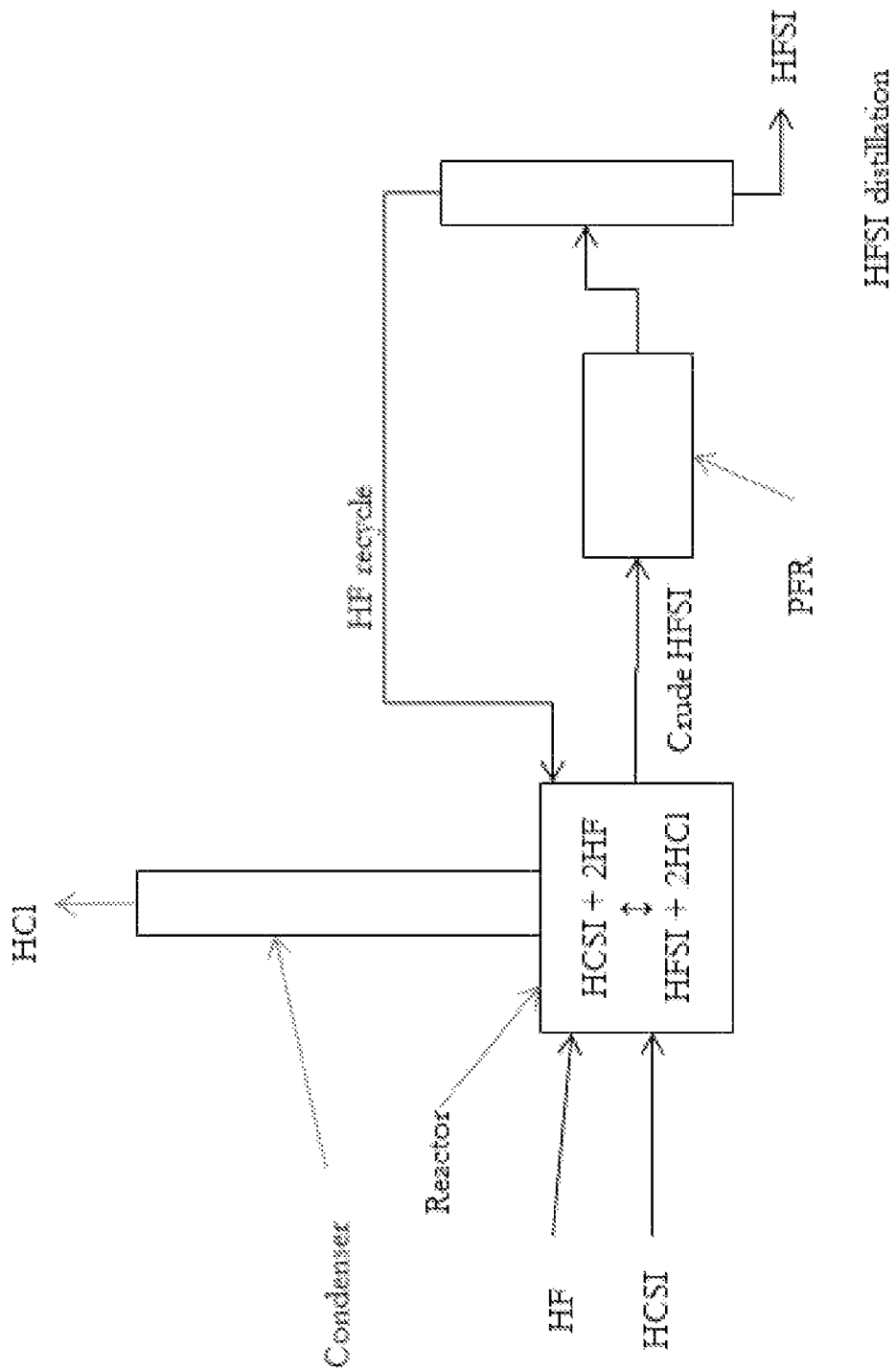
FIG. 2 is a schematic illustration of one particular embodiment of a continuous HFSI production reactor system.

In continuous operation, a continuous stirred tank reactor (CSTR) is advantageous as it allows HF refluxing and continuous HCl removal. By design, a CSTR cannot operate at complete conversion, and therefore, the product from the reactor is crude and has residual HF and HCSI. The HFSI product can be purified by two stage distillation to remove volatile HF and the high boiling HCSI. The recovered HF and HCSI can be recycled back into the CSTR. See FIG. 1. The second stage distillation is advantageously operated under vacuum (10-30 torr) in order to avoid thermal degradation of the HFSI product. Alternatively, a plug flow reactor (PFR) may follow the CSTR, wherein the unreacted HCSI is completely converted to HFSI. See FIG. 2. In this configuration, only a single distillation column or gas stripping column is required to remove volatile HCl and recover HF. Again, the recovered HF can be recycled by returning it back to the CSTR.

Additional objects, advantages, and novel features of this invention will become apparent to those skilled in the art upon examination of the following examples thereof, which are not intended to be limiting. In the Examples, procedures that are constructively reduced to practice are described in the present tense, and procedures that have been carried out in the laboratory are set forth in the past tense.

EXAMPLES

Example 1

A 120 mL PFA reactor with a PFA coated thermocouple, a PTFE coated magnetic stir bar, and PTFE boiling stones was charged with 47.4 g (0.221 mol) HCSI. The reactor was connected to a condenser consisting of a vertical 60 mm long PTFE tube having an internal diameter of 9.5 mm. The outside of the condenser tube was jacketed with a vessel holding a mixture of dry ice and methanol. The top of the condenser was swept with dry argon, which carried gases from the top of the condenser to an alkaline scrubber before venting. An inlet port to the reactor provided means to feed gaseous HF into the system which would condense in the condenser and drip into the reactor. The reactor was immersed in a heated and stirred oil bath. A target addition of 8.86 g (0.443 mol) HF was required to convert the HCSI to HFSI. HF was added in increments. The first addition was 3.5 g (0.175 mol) HF, and the solution boiled at 36.5° C. and was refluxing. Ambient pressure was 82 kPa. No change in boiling point was observed over 15 minutes, which suggested that the reaction rate was negligible. The reactor was cooled in an ice bath, opened under flowing argon, and 1.5 g $BiCl_3$ was added after which the reactor was resealed and reheated. Boiling and refluxing was observed at 39° C., and the reaction temperature slowly increased to 81° C. over 1.5 hours. Another 0.6 g HF was added, which dropped the boiling point to 69.8° C. and slowly heated to 82.5° C. in 6 minutes. HF was periodically added when the boiling point was slightly above about 80° C. in 0.4 to 1.2 g portions until a total of 11.8 g (0.590 mol) was added. The last addition resulted in an initial boiling point of 58° C., which slowly rose to 66° C. and remained constant while refluxing for more than 30 minutes. The condenser was heated to room temperature and refluxing stopped while excess HF was allowed to boil from the reactor at 100° C. for 1 hour. The reactor was cooled in an ice bath and a crystallization of the reactor contents was observed at 18.5° C. After melting the product, a white solid ($BiF_3$) settled out and a sample of the liquid was taken for ion chromatography. Anion mode ion chromatography indicated nearly 100% $FSI^-$ and about 150 $ppm_w$ $Cl^-$ and 700 $ppm_w$ $F^-$.

Example 2

Using the same reactor system as described in Example 1, 51.768 g (0.242 mol) of HCSI was charged to the reactor. No bismuth material or PTFE boiling stones were added. The reactor was heated to 100° C., and HF was added portion wise while trying to maintain the reaction temperature near 100° C. The reactor temperature ranged between 61 and 110° C. between HF additions, and the mass of HF added was not recorded. After multiple small HF additions over the course of 4.5 hours, the temperature stabilized at 85° C. The reactor was cooled and began crystallization at 12.2° C. The condenser was heated to room temperature and the reactor reheated to about 115° C. with argon flowing through the reactor for about 30 minutes to remove excess HF from the liquid product. The contents were then cooled and a melting point of 18.6° C. was measured. The product weighed 42.798 g, which corresponds to 0.236 mol and a 98% as HFSI. As sample was taken and analyzed by ion chromatography, which indicated nearly 100% $FSI^-$ and about 200 $ppm_w$ $Cl^-$, 450 $ppm_w$ $F^-$, and 1000 $ppm_w$ sulfate.

Example 3

Using the same reactor system as described in Example 1, 51.184 g (0.239 mol) of HCSI and 2.86 g (0.00907 mol) $BiCl_3$ were charged to the reactor. The reactor was heated to 100° C., and HF was slowly added while trying to maintain the reaction temperature near 100° C. The reaction temperature ranged between 90 and 110° C. Over the course of 3.5 hours and after multiple small HF additions, the reaction temperature stabilized at 96° C. The condenser was allowed to heat to room temperature and the reactor was heated to 100° C. under flowing argon for 1.25 hours in order to remove excess HF. Then the reactor was cooled and a melting point of about 9.2° C. was measured. The product weighed 45.261 g, which corresponds to a 99% yield including conversion of $BiCl_3$ to $BiF_3$. A sample of liquid product was taken and analyzed by ion chromatography, which indicated nearly 100% $FSI^-$ and about 200 $ppm_w$ $Cl^-$ and 600 $ppm_w$ $F^-$.

Example 4

A reactor described in Example 1 was charged with 64.915 g (0.303 mol) HCSI and 16.927 g (0.0537 mol) $BiCl_3$. The reactor was heated to about 60° C. and HF was added to maintain a boiling point of about 60° C. 18 HF additions were performed. The last HF addition was at 3.5 hours, and the reactor was allowed to react for another hour. After a total reaction time of 4.5 hours, the reactor was evacuated at 60° C. to remove excess HF. A sample was analyzed by ion chromatography, which indicated nearly 100% $FSI^-$ and about 170 $ppm_w$ $Cl^-$ and 3500 $ppm_w$ $F^-$.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for producing a high yield of hydrogen bis(fluorosulfonyl)imide (HFSI) from hydrogen bis(halosulfonyl)imide (HXSI) using hydrogen fluoride, said method comprising reacting HXSI with HF and during the reaction, selectively removing HX that is produced in the reaction to produce HFSI in at least 80% yield, wherein each X is independently Cl, Br, or I.

2. The method according to claim 1, wherein said reacting step also produces HX.

3. The method according to claim 1, wherein HXSI is reacted with HF under HF refluxing condition.

4. The method according to claim 3, wherein HXSI is reacted with HF at atmospheric pressure.

5. The method according to claim 1, wherein each X is Cl.

6. The method according to claim 1, wherein said step of reacting HXSI with HF comprises adding HF batch-wise.

7. The method according to claim 1, wherein said step of reacting HXSI with HF comprises adding HF continually.

8. The method according to claim 1, wherein the reaction temperature is at least 30° C. 30° C.

9. The method according to claim 1, wherein at least 2 equivalent of total HF is added to the reaction.

10. The method according to claim 1, wherein the yield of HFSI is at least 90%.

11. The method according to claim 1, wherein HXSI is reacted with HF in the presence of a catalyst.

12. The method according to claim 11, wherein said catalyst comprises a Bi(III) compound.

13. The method according to claim 12, wherein said Bi(III) compound is a bismuth trihalide.

14. The method according to claim 11, wherein about 0.5 equivalent or less of said catalyst is added to the reaction.

15. A process for producing hydrogen bis(fluorosulfonyl)imide (HFSI) from hydrogen bis(chlorosulfonyl)imide (HCSI), said process comprising:
reacting HCSI with HF under HF refluxing condition
and selectively removing hydrochloric acid (HCl) that is formed in the reaction, wherein said process produces at least 80% yield of HFSI.

16. The process of claim 15, wherein the reaction condition comprises atmospheric pressure.

17. The process of claim 15, wherein HCSI is reacted with HF in the presence of a catalyst.

18. The process of claim 17, wherein said catalyst comprises a Bi(III) compound.

19. The process of claim 18, wherein the Bi(III) compound comprises bismuth trichloride, bismuth trifluoride, or a combination thereof.

20. A method for producing a high yield of hydrogen bis(fluorosulfonyl)imide (HFSI) from hydrogen bis(halosulfonyl)imide (HXSI) using hydrogen fluoride, said method comprising reacting HXSI with HF under HF refluxing condition to produce HFSI in at least 80% yield, wherein each X is independently Cl, Br, or I.

* * * * *

UNITED STATES PATENT AND TRADEMARK OFFICE
CERTIFICATE OF CORRECTION

| | | |
|---|---|---|
| PATENT NO. | : 8,722,005 B1 | Page 1 of 1 |
| APPLICATION NO. | : 13/951973 | |
| DATED | : May 13, 2014 | |
| INVENTOR(S) | : Joseph Carl Poshusta et al. | |

It is certified that error appears in the above-identified patent and that said Letters Patent is hereby corrected as shown below:

In the claims

Column 8 line 12 in Claim 8, please replace the last line with the following rewritten line:

--temperature is at least 30 °C.--

Signed and Sealed this
Third Day of May, 2016

Michelle K. Lee
*Director of the United States Patent and Trademark Office*